United States Patent
Law et al.

(10) Patent No.: US 10,101,771 B2
(45) Date of Patent: Oct. 16, 2018

(54) REMOTE CONTROL DOCKING STATION AND SYSTEM

(71) Applicant: Remotec Technology Limited, Hong Kong (HK)

(72) Inventors: Wing Kin Law, Hong Kong (HK); Hon Wan Leung, Hong Kong (HK); Daniel Chun, Hong Kong (HK)

(73) Assignee: REMOTEC TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 15/857,668

(22) Filed: Dec. 29, 2017

(65) Prior Publication Data
US 2018/0120898 A1 May 3, 2018

Related U.S. Application Data

(63) Continuation-in-part of application No. 15/584,040, filed on May 2, 2017, now Pat. No. 9,892,634.

(60) Provisional application No. 62/342,205, filed on May 27, 2016.

(51) Int. Cl.
| | |
|---|---|
| *G06F 1/16* | (2006.01) |
| *H04N 21/422* | (2011.01) |
| *H04M 1/04* | (2006.01) |
| *H04M 1/725* | (2006.01) |
| *H02J 7/00* | (2006.01) |
| *H04N 5/44* | (2011.01) |

(52) U.S. Cl.
CPC ............ *G06F 1/1632* (2013.01); *H04M 1/04* (2013.01); *H04M 1/72533* (2013.01); *H04N 21/4222* (2013.01); *H04N 21/42226* (2013.01); *G08C 2201/92* (2013.01); *G08C 2201/93* (2013.01); *H02J 7/0052* (2013.01); *H04N 2005/4405* (2013.01)

(58) Field of Classification Search
CPC .............. G06F 1/1632; G08C 2201/92; G08C 2201/93; H04N 21/4222; H04N 21/42226; H04N 2005/4405; H04N 2005/4426
See application file for complete search history.

(56) References Cited

U.S. PATENT DOCUMENTS

| | | | | |
|---|---|---|---|---|
| 9,215,394 | B2 * | 12/2015 | Barnett | G08C 17/02 |
| 9,892,634 | B2 * | 2/2018 | Law | G08C 23/04 |
| 2006/0127034 | A1 * | 6/2006 | Brooking | H04N 5/765 |
| | | | | 386/231 |

(Continued)

*Primary Examiner* — Glenn A. Auve

(57) ABSTRACT

The system, method and device for enabling remote-control of consumer electronic devices is disclosed. The system may comprise a docking station. The docking station may comprise an infrared receiving module and Micro-controller unit (MCU). The pre-processor of the infrared receiving module or the processor of the MCU may demodulate the one or more input control signals received from an input control device or a first communication device respectively. The pre-processor or the processor may modulate the one or more input control signals demodulated to obtain one or more modulated control signals. Further, the processor may retrieve one or more infrared codes from a preconfigured database based upon the one or more modulated control signals. The processor may transmit the one or more infrared codes to one or more consumer electronics device in order to remotely control the one or more consumer electronic devices.

20 Claims, 18 Drawing Sheets

(56) References Cited

U.S. PATENT DOCUMENTS

| | | | | |
|---|---|---|---|---|
| 2008/0028430 A1* | 1/2008 | Kreiner | ............... | H04N 5/4403 |
| | | | | 725/78 |
| 2012/0206555 A1* | 8/2012 | Yoshida | ............. | B60R 11/0241 |
| | | | | 348/14.02 |
| 2015/0304590 A1* | 10/2015 | Sugita | ................... | G08C 17/02 |
| | | | | 348/734 |
| 2016/0210848 A1* | 7/2016 | Metrani | ................ | G08C 23/04 |

* cited by examiner

REMOTE CONTROL DOCKING STATION AND SYSTEM

CROSS-REFERENCE TO RELATED APPLICATIONS AND PRIORITY

The present application is a continuation-in-part application of U.S. patent application Ser. No. 15/584,040 filed on May 2, 2017 and claiming priority from U.S. Provisional Patent Application No. 62/342,205 dated May 27, 2016, the entire contents of which are incorporated herein by a reference.

TECHNICAL FIELD

The present application described herein, in general, relates to system and method for enabling remote control of one or more consumer electronic devices.

BACKGROUND

Most modern families own at least five to ten smart devices at their home. All of these smart devices must be charged via an external power supply. Usually, a charging dock or a docking station is employed for charging these smart devices. With the advent of the mobile communication technology, various mobile devices have been developed which adopts different types of connector for charging and communication. The most common forms of chargers available today are micro-USB Type B and iPhone's 30 pin and Lightning. Further, some of the existing phone uses mini USB. Furthermore, a new standard in form of a micro-USB Type C is also provided in the recently developed mobile devices. These chargers are provided with a connector that enables physical connection with the mobile devices. The physical connection via the connector further facilitates charging of the mobile devices via other popular techniques such as electro-magnetic methods. In addition to charging, most of these connectors have the capability of facilitating data communication between the mobile devices and a host computer.

Therefore, in order to facilitate the charging of the mobile devices, various forms of cradles and docks have been proposed to provide dual functions. The first function being to charge the mobile devices and the second function being to provide data communication capability amongst the devices to synchronize data including images, videos, text, contract addresses, and the like. Additionally, the cradles or docks proposed in the art enable the functionalities of an alarm clock, a radio and further may be utilized for connecting to a cordless phone. In the existing art, a docking station that provides an electricity charge to a remote controller unit is available. Such a docking station or a charging cradle may detect whether the remote controller unit is connected and accordingly provide information to an external system. However, such charging cradle/docking station relies on the remote controller unit itself to emit radio signals or infrared signals. Further, a bridging device is available that is connected to a central server to receive command calls and changes these command calls, assesses a separate central server and then transmits infrared signals through a separate bridge device.

SUMMARY

This summary is provided to introduce concepts related to a remote-control docking station and system(s)/method(s) thereof are further described below in the detailed description. This summary is not intended to identify essential features of the claimed subject matter nor is it intended for use in determining or limiting the scope of the claimed subject matter.

In one implementation, a remote-control system is described. The system may include a docking station. The docking station may further include an infrared receiving module and a Micro-controller unit (MCU). The infrared receiving module may be communicatively coupled with an input control device. The Infrared receiving module may further include a pre-processor and a memory unit coupled with the pre-processor. The pre-processor may execute programmed instructions stored in the memory unit. The MCU may further include a processor and a memory coupled with the processor. The processor may execute programmed instructions stored in the memory. The pre-processor or the processor, based upon receipt of one or more input control signals from the input control device and a first communication device respectively, may be configured to execute one or more programmed instructions to demodulate the one or more input control signals and modulate the one or more input control signals demodulated to obtain one or more modulated control signals. Further, the processor may be configured to execute one or more programmed instructions to retrieve one or more infrared codes from a preconfigured database based upon the one or more modulated control signals. Further, the processor may be configured to execute one or more programmed instructions to transmit the one or more infrared codes to one or more consumer electronics device in order to remotely control the one or more consumer electronic devices.

In another implementation, a method enabling remote control of one or more consumer electronic devices is described. The method may include receiving, via an infrared receiving module or a second communication device, one or more input control signals transmitted by an input control device and a first communication device respectively. The method may include performing by the pre-processor within the infrared receiving module or the processor within the docking station, based upon receipt of one or more input control signals from the input control device and the first communication device respectively, the steps of demodulating the one or more input controls, and modulating the one or more input control signals demodulated to obtain one or more modulated control signals. Further, the method may include retrieving, via the processor, one or more infrared codes from a preconfigured database based upon the one or more modulated control signals. Further, the method may include transmitting, via the processor, the one or more infrared codes to one or more consumer electronics device in order to remotely control the one or more consumer electronic devices.

In yet another implementation, a docking station is disclosed. The docking station may include an infrared receiving module and a Micro-controller unit (MCU). The infrared receiving module may be communicatively coupled with an input control device. The Infrared receiving module may further include a pre-processor and a memory unit coupled with the pre-processor. The pre-processor may execute programmed instructions stored in the memory unit. The MCU may further include a processor and a memory coupled with the processor. The processor may execute programmed instructions stored in the memory. The pre-processor or the processor, based upon receipt of one or more input control signals from the input control device and a first communication device respectively, may be configured to execute one or more programmed instructions to demodulate the one or more input control signals and modulate the one or more input control signals demodulated to obtain one or more modulated control signals. Further, the processor may be configured to execute one or more programmed instructions to retrieve one or more infrared codes from a preconfigured database based upon the one or more modulated control signals. Further, the processor may be configured to execute one or more programmed instructions to transmit the one or more infrared codes to one or more consumer electronics device in order to remotely control the one or more consumer electronic devices.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

System(s), method(s) and device(s) for enabling remote control of one or more consumer electronic devices are described. The system may include a docking station. The docking station may further include an infrared receiving module and a Micro-controller unit (MCU). The infrared receiving module may be communicatively coupled with an input control device. The Infrared receiving module may further include a pre-processor and a memory unit coupled with the pre-processor. The pre-processor may execute programmed instructions stored in the memory unit. The MCU may further include a processor and a memory coupled with the processor. The processor may execute programmed instructions stored in the memory. In one embodiment, the pre-processor of the infrared receiving module or the processor of the MCU may receive one or more input control signals from the input control device and a first communication device respectively. In one embodiment, the docking station may be electrically coupled with the second communication device. The second communication device may be communicatively coupled with the first communication device.

Figure 1:
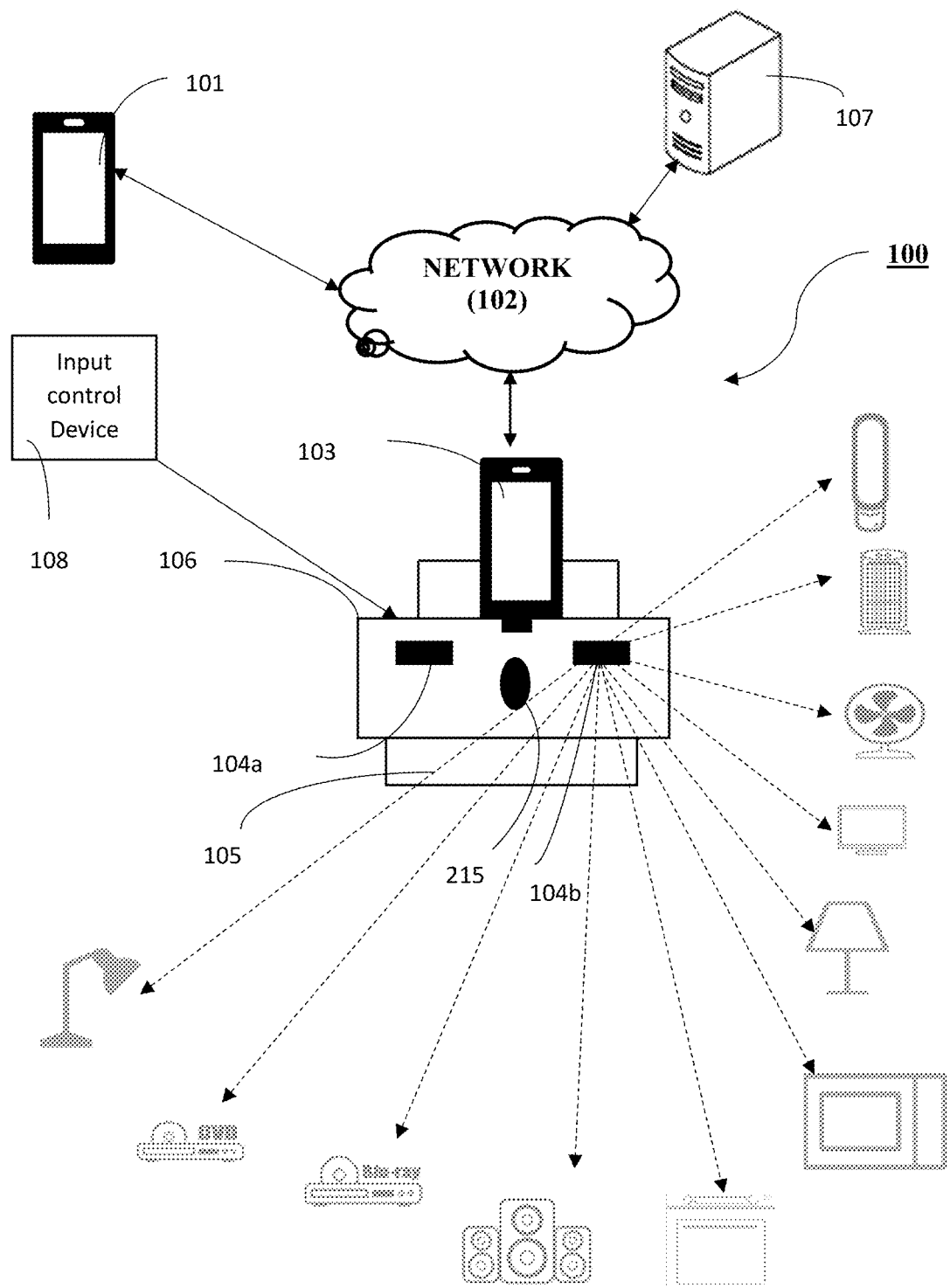
FIG. 1 illustrates a system 100 enabling remote control of consumer electronic devices via a remote-control docking station and other system components, in accordance with an embodiment of the present application.

In accordance to aspects of the present application, the pre-processor or the processor, based upon receipt of one or more input control signals from the input control device and a first communication device respectively, may be configured to execute one or more programmed instructions to demodulate the one or more input control signals and modulate the one or more input control signals demodulated to obtain one or more modulated control signals. Further, the processor may be configured to execute one or more programmed instructions to retrieve one or more infrared codes from a preconfigured database based upon the one or more modulated control signals. Further, the processor may be configured to one or more programmed instructions to transmit the one or more infrared codes to one or more consumer electronics device in order to remotely control the one or more consumer electronic devices. Now referring to FIG. 1, a system 100 enabling remote control of consumer electronic devices via a remote-control docking station and other system components is illustrated. As shown, the system 100 may comprise a first communication device 101, a second communication device 103, a docking station 106, and an input control device 108. In one exemplary embodiment the input control device may be a remote controller or a universal remote controller capable of controlling electronic device via infrared signals or alike. In one embodiment, the first communication device 101 may be communicatively coupled with second communication device 103. In one exemplary embodiment, the first communication device 101 may be communicatively coupled to the second communication device 103 through a network 102. In one implementation, the network 102 may be a wireless network. The network 102 can be accessed by the device using wireless network connectivity means including updated communications technology. In one exemplary embodiment, the first communication device 101 may provide connectivity with the second communication device 103 through short-message services (SMS), wireless data using GPRS/3G/4G or through public internet via Wi-Fi, or locally with other radio-communication protocol standards such as Wi-Fi, Z-Wave, ZigBee, Bluetooth, Bluetooth Low Energy, LoRA, NB-IoT, SigFox, Digital Enhanced Cordless Telecommunications (DECT), or other prevalent technologies. It will be understood that the first communication device 101 and the second communication device 103 may be accessed by multiple users through applications residing on the first communication device 101 and the second communication device 103. The applications residing on the first communication device 101 and the second communication device 103 may respectively enable various functionalities/methodologies implemented by the first communication device 101 and the second communication device 103, the details of which are hereinafter explained.

In an embodiment, the first communication device 101 may include one of a portable computer, a personal digital assistant, a handheld device, a mobile, a laptop computer, a desktop computer, a notebook, a workstation, a mainframe computer, and the like. In one embodiment, the second communication device 102 may include one of a portable computer, a personal digital assistant, a handheld device, a mobile, a laptop computer, and the like. The second communication device may be further communicatively coupled with a cloud server 107 via the network 102 as shown.

Figure 2:
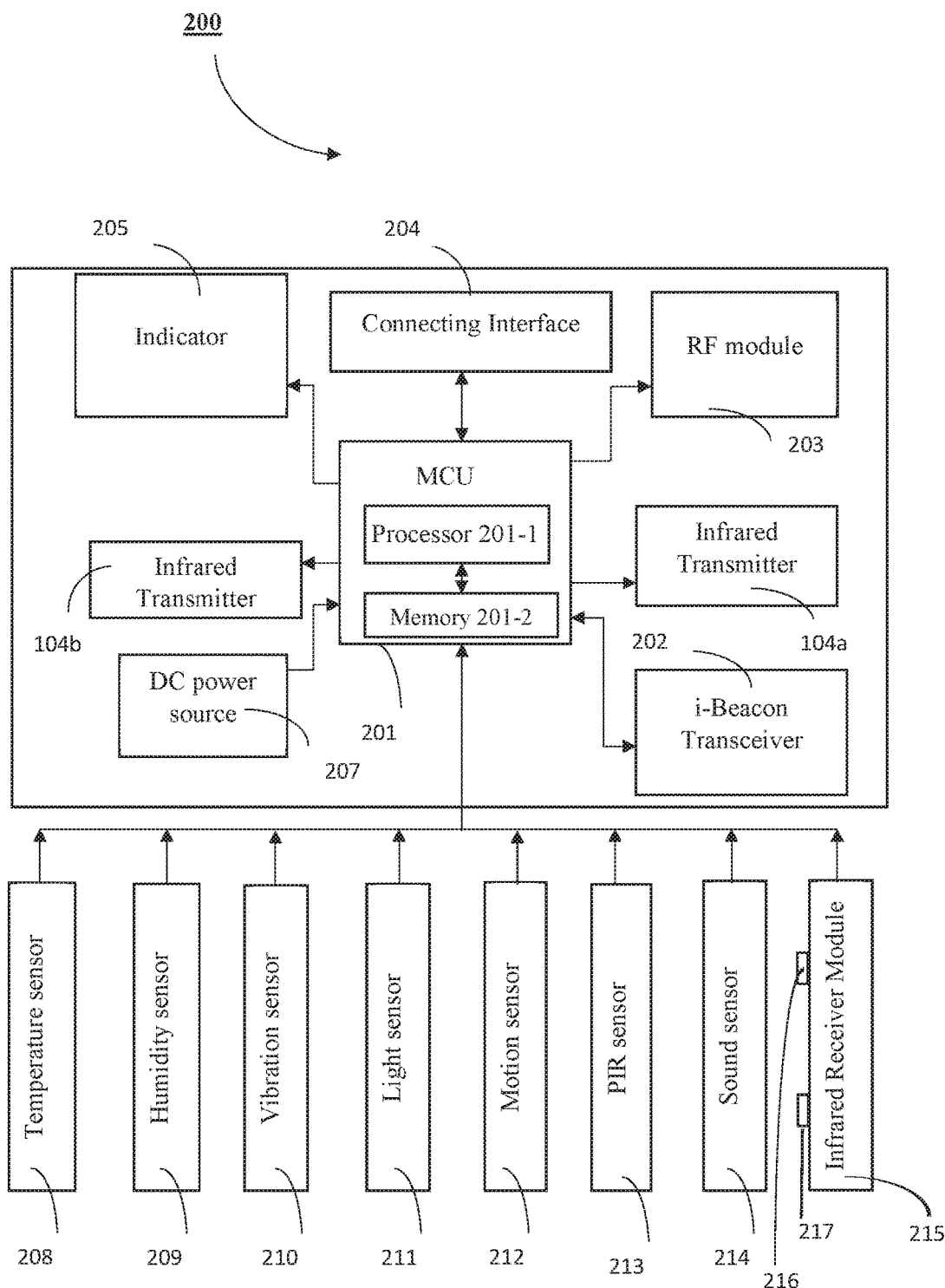
FIG. 2 illustrates a block diagram 200 depicting components of the docking station, in accordance with an embodiment of the present application.

In one embodiment, the first communication device 101 may provide user login and credential control management through network 102 to the user for registration with the system 100. In one exemplary embodiment, the user of the first communication device 101 may transmit input control signal or instructions to the second communication device 103 via the first communication device 101. In another embodiment, the user may transmit the input control signal or instructions to an infrared receiver module (as shown in FIG. 2) via the input control device 108. In one embodiment, the second communication device 103 may be capable of receiving one or more input control signals from the first communication device 101. In one embodiment, the second communication device 103 may provide internet connection gateway.

In an embodiment, the second communication device 103 may be electronically coupled with the docking station 106. In one implementation, the second communication device 103 may be coupled with the docking station 106 via connection interface comprising USB or through radio frequency protocol from a group comprising Bluetooth, Wi-Fi, ZigBee, Z-Wave, LoRA, NB-IoT, SigFox, DECT, or other prevalent technologies. In one embodiment, the docking station 106 may comprise infrared transmitters 104a, 104b along with infrared firmware; wherein the infrared transmitter 104a and 104b may be configured to transmit one or more infrared codes to one or more consumer electronics device in order to remotely control the one or more consumer electronics, the details of which will be further explained in subsequent paragraphs. In one embodiment, the docking station 106 may comprises a motorized gearbox 105 in order to provide a tilt and pan functions. In another embodiment, the docking station 106 may act as a new form factor of the electronic appliance or consumer electronics such as a fan or a Television (TV).

Now referring to FIG. 2., a block diagram 200 depicting components of the docking station 106 is illustrated, As shown, the docking station 106 may comprise a Microcontroller Unit (MCU) 201, wherein the MCU 201 further comprises a processor 201-1 and a memory 201-2. The docking station 106 may further comprise a Radio Frequency (RF) module 203, a DC power source 207, Infrared transmitters (104a, 104h), a connecting interface 204, an indicator 205 and a plurality of input sensors. The plurality of sensors may include a temperature sensor 208, a humidity sensor 209, a vibration sensor 210, a light sensor 211, a motion sensor 212, a passive infrared sensor (PIR) sensor 213, a sound sensor 214 and an Infrared receiver module 215. Further, the Infrared receiver module 215 includes a pre-processor 216 and a memory unit 217 coupled with the pre-processor 216. In one embodiment, the connecting interface 204 may enable connection of the docking station 106 with the second communication device 103. In one exemplary embodiment, the second communication device 103 may connect with the connecting interface 204 through the USB or lightning interface. In one embodiment, the docking station 106 may connect with the second communication device 103 through the RF module 203 using radio frequency protocol selected from group comprising Bluetooth, Wi-Fi, ZigBee, DECT, and Z-Wave. In one embodiment, the processor 201-1 may execute programmed instructions stored in the memory 201-2. In another embodiment, the pre-processor 216 may execute programmed instructions stored in the memory unit 217. Specifically, the processor 201-1 may execute a programmed instruction for demodulating the one or more input control signals received by the second communication device 103 from the first communication device 101. In another embodiment, the pre-processor 216 may execute a programmed instruction for demodulating the one or more input control signals received by the infrared receiving module 215 from the input control device 108. Further, the processor 201-1 may execute a programmed instruction for modulating the one or more input control signals demodulated to obtain one or more modulated control signals. In another embodiment, the pre-processor 216 may execute a programmed instruction for modulating the one or more input control signals demodulated to obtain the one or more modulated control signals. The processor 201-1 may further execute a programmed instruction for retrieving one or more infrared codes from a preconfigured database (not shown) based upon the one or more modulated control signals. In one embodiment, the preconfigured database may be embedded within the memory 201-2 of the MCU 201 or within the cloud server 107.

In one embodiment, the docking station 106 may communicate with the cloud server 107 for retrieval of the infrared codes through the network 102 using computing power of the second communication device 103 acting as an internet connection gateway for the docking station 106. In one embodiment, the preconfigured database may comprise infrared codes for each of the consumer electronics devices to be controlled remotely. In one embodiment, the processor 201-1 may be electronically coupled with the infrared transmitters 104a and 104b. The processor 201-1 may instruct the infrared transmitters 104a and 104b to transmit the one or more infrared codes to one or more consumer electronic devices in order to remotely control the one or more consumer electronic devices. In one exemplary embodiment, the or more consumer electronic devices controlled remotely may include, but not limited to, television sets (TVs), set-top boxes (STBs), air-conditioners (ACs), fan, oven, lamps, washing machine, DVD, music stereo, and the like.

In one embodiment, the docking station 106 may comprise a DC power source 207 adapted to provide power to the MCU 201 and the other components of the docking station 106. In one embodiment, the docking station may further provide a constant power supply to the second communication device 103 coupled with the docking station 106. In one embodiment, the docking device 106 may include a circuitry which provides adequate trickle charge power for the second communication device 103. In one embodiment, the docking station 106 may further comprise an indicator 205 which is indicative of the current state of system. In one embodiment, the docking station 106 may have physical buttons or switches (not shown in the Figure).

In one embodiment, the docking station 106 may comprise an i-beacon transceiver 202. In one embodiment, the i-beacon transceiver 202 may transmit signal from the docking station 106 to the first communication device 101 and receive signal from the first communication device 101 within 20-meter range.

In one embodiment, as shown in FIG. 2, the processor 201-1 may receive an input in form of temperature readings from the temperature sensor 208 and further transmit the temperature readings to the first communication device 101 through the second communication device 103. In one embodiment, the temperature readings may be transmitted by the second communication device 103 to the first communication device 101 through network 102 using the communication channel selected from a group comprising SMS, Wi-Fi, GPRS/3G/4G, and Bluetooth.

In another embodiment, as shown in FIG. 2, the processor 201-1 may receive an input in form of humidity readings from the humidity sensor 209 and further transmit the humidity readings to the first communication device 101 via the second communication device 103. In yet another embodiment, the processor 201-1 may receive inputs from the PR sensor 213 and the motion sensor 212 to detect motion of a moving object, particularly the motion of the user. In yet another embodiment, the processor 201-1 may receive an input from the light sensor 211 to validate adequate light outside and accordingly trigger a signal for switching on the lights. In yet another embodiment, the processor 201-1 may receive an input from the sound sensor 214 to detect a sound signal. The processor 201-1 may process the sound signal information and take an appropriate action accordingly. In still another embodiment, processor 201-1 may receive an input from the vibration sensor 214 to sense vibrations and take an appropriate action accordingly. In yet another embodiment, the processor 201-1 may receive input from the Infrared receiver module (215).

Figure 3:
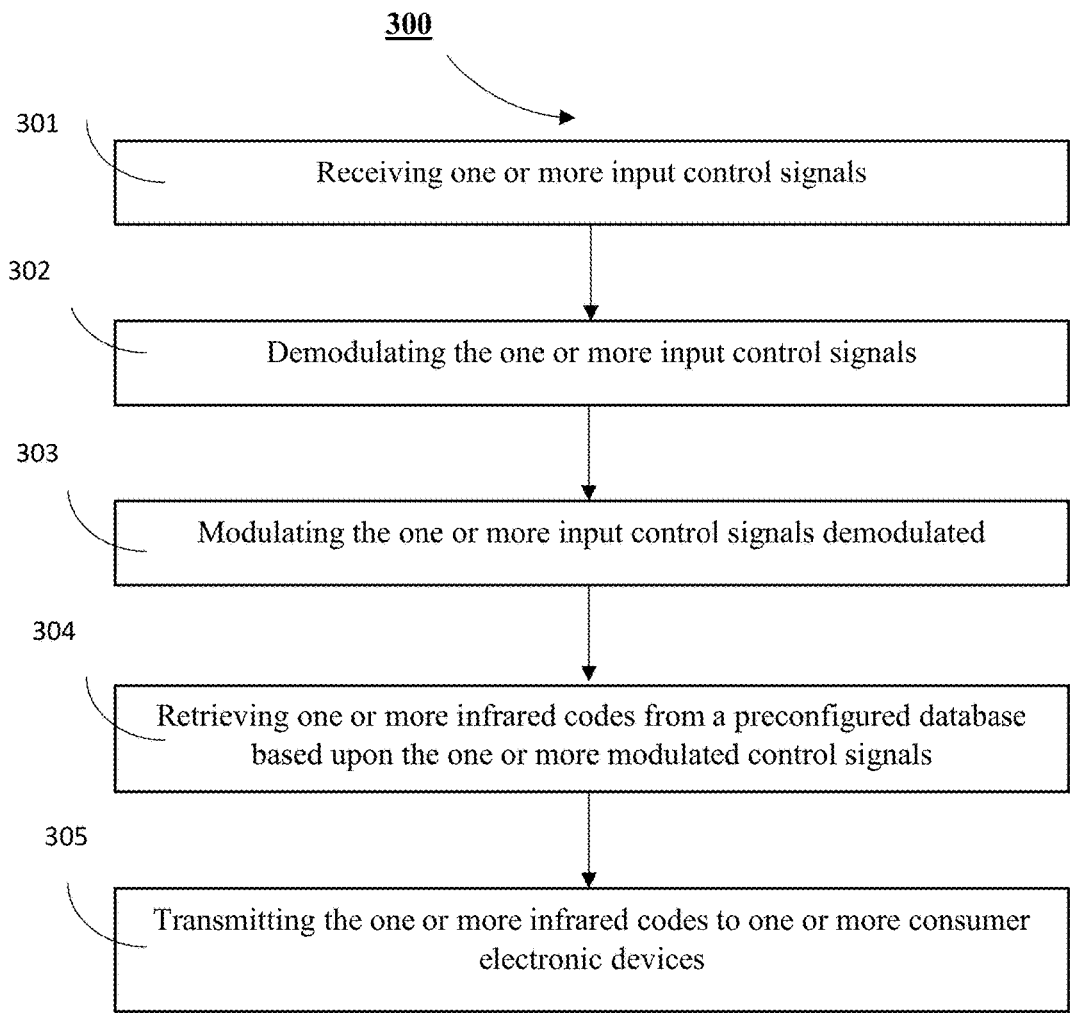
FIG. 3 illustrates a method 300 for enabling remote control of consumer electronic devices, in accordance with an embodiment of the present application.

Now referring to FIG. 3, a method 300 for enabling remote control of consumer electronic devices is illustrated. In one embodiment, at step 301, the second communication device 103, may receive the one or more input control signals from the first communication device 101. In one embodiment, the second communication device 103 may receive the one or more input control signals from the first communication device 101 through the network 102. In one exemplary embodiment, the first communication device 101 may communicate with the second communication device 103 through short-message services (SMS), or wireless data using GPRS/3G/4G or through public internet via Wi-Fi, or locally with other radio-communication protocol standards such as Wi-Fi, Z-Wave, ZigBee, Bluetooth, Bluetooth Low Energy (BLE), LoRA, NB-IoT, SigFox, DECT, or other prevalent technologies, and the like. In another embodiment, at step 301, the infrared receiver module 215, may directly receive the one or more input control signals from the input control device 108. In one embodiment, the infrared receiver module 215 may receive the one or more input control signals from the input control device 108 in the form of infrared signals.

At step 302, the processor 201-1 of the docking station 106 may demodulate the one or more input control signals received by the second communication device 101. In one embodiment, the infrared receiver module 215 may be configured to receive one or more input control signals from the second communication device 103. In one embodiment, the processor 201-1 may receive one or more input control signals from the infrared receiver module 215. The processor 201-1 may be configured to perform analysis of the one or more input control signals received. In one embodiment, the processor 201-1 may decode the received signals into carrier frequency, number of bits, number of timing, and mark/period of timing sequence. In another embodiment, at step 302, the pre-processor 216 of the infrared receiving module 215 may demodulate the one or more input control signals directly received from the input control device 108. The pre-processor 216 may be configured to perform analysis of the one or more input control signals received.

At step 303, the processor 201-1 may modulate the signal demodulated to obtain one or more modulated control signals. In one embodiment, the processor 201-1 may modulate the signal modulated by packing the demodulated signal into a control signal. In another embodiment, at step 303, the pre-processor 216 of the infrared receiving module 215 may modulate the signal modulated by packing the demodulated signal into a control signal. In one exemplary embodiment, the pre-processor 216 may convert the infrared signal into a digital data and further perform analysis of the digital data. The pre-processor 216 may check whether received infrared signal is valid or not based upon analyzed digital data. Further, the pre-processor 216 may transmit the one or more input control signals modulated to the processor 201-1 of the MCU. The processor 201-1 may send the control signal to the second communication device 103. In one embodiment, the second communication device 103 may send the control signal to cloud server 107. In one embodiment, the cloud server 107 may be configured to search all infrared code numbers which may be mapped with the control signal.

At step 304, the processor 201-1 may retrieve one or more infrared codes from a preconfigured database based upon the one or more modulated control signals. The preconfigured database may be embedded either within the memory 201-2 within the cloud server 107. In one embodiment, the preconfigured database may comprise infrared codes corresponding to each of the consumer electronics devices. Specifically, the preconfigured database may store a predefined mapping of the modulated control signals with the infrared codes. Thus, the processor 201-1 may compare each modulated control signal obtained in step 302 with the infrared codes stored in the preconfigured database to retrieve an infrared code mapped with the said modulated control signal. In one exemplary embodiment, the second communication device 103 may retrieve all infrared code numbers from the cloud server 107. Further, the second communication device 103 may request the processor 201-1 to send the infrared signal one by one and further prompt the user to confirm in order to control the corresponding consumer electronics device. In one embodiment, the second communication device 103 may store the infrared code numbers retrieved from the cloud server 107.

At step 305, the processor 201-1 may transmit, via the IR transmitters (104-a, 104-b), the one or more infrared codes to one or more consumer electronic devices to remotely control the one or more consumer electronic devices.

Figure 4:
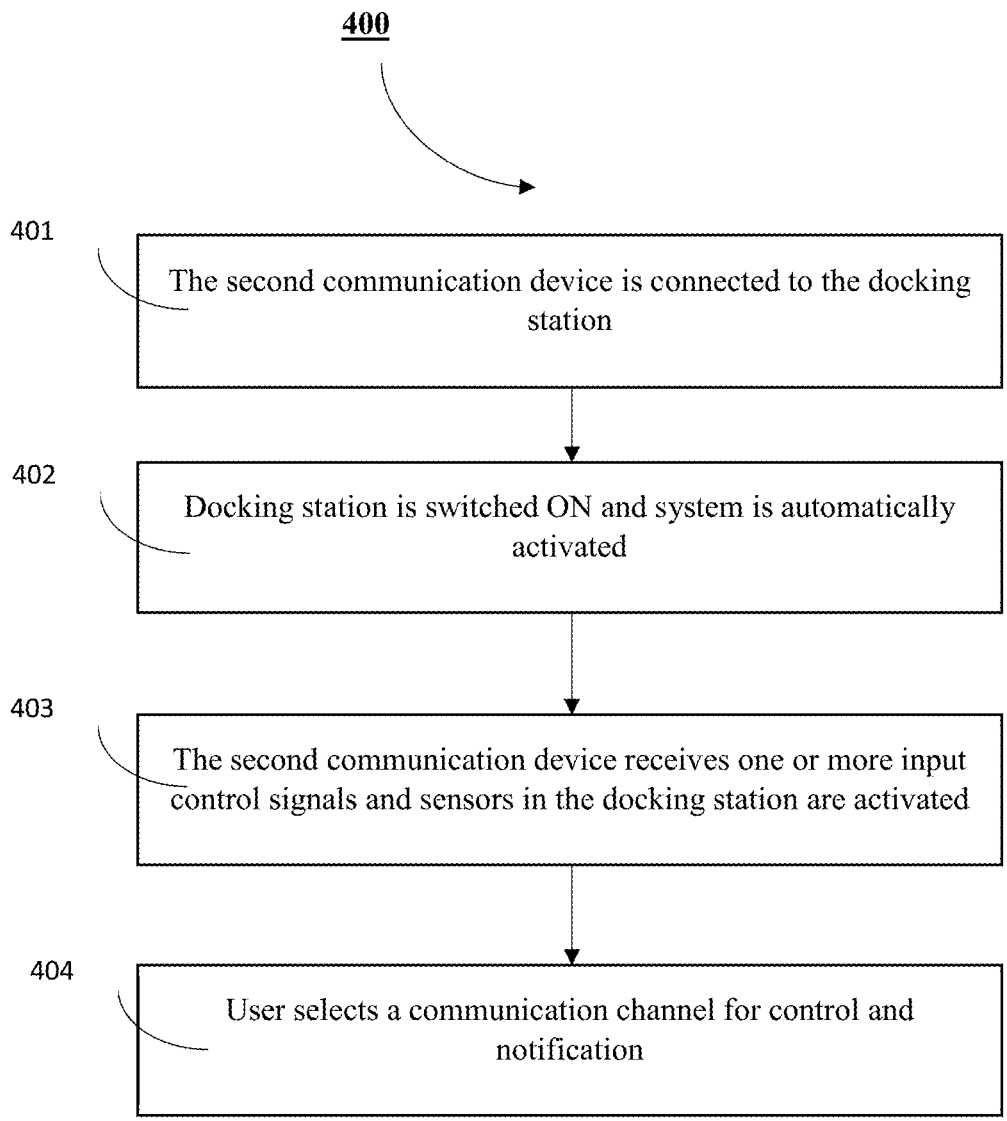
FIG. 4 illustrates a flow diagram 400 depicting steps implemented for docking station connection and setup, in accordance with an embodiment of the present application.

Now referring to FIG. 4, the flow diagram 400 illustrates steps involved in the implemented for docking station connection and setup, in accordance with an embodiment of the present application. At step 401, the second communication device 103 may be physically connected to the docking station 106. At step 402, the docking station 106 is triggered to be switched on and the application implemented on the second communication device 103 may be activated thereby automatically activating the system. In one embodiment, the second communication device 103 may wait to receive new control from the users. In one embodiment, the second communication device 103 may wait to receive new control signal from the first communication device 101. In another embodiment, the second communication device 103 may wait to receive new control signal from the user directly. At step 403, the second communication device 103 may receive one or more input control from the Users. In one embodiment, the second communication device 103 may receive one or more input control signal from the first communication device 101. In another embodiment, the second communication device 103 may receive one or more input control signal from the user directly. Based upon the receipt of the one or more input control signals, the sensors of the docking station 106 may be activated. In one embodiment, each of the plurality of sensors may provide additional data input. At step 404, user may select a communication channel for control and notification. In one embodiment, the communication channel may be selected from a group comprising short-message services (SMS), GPRS/3G/4G, Wi-Fi, Z-Wave, ZigBee, Bluetooth, Bluetooth Low Energy (BLE), LoRA, NB-IoT, SigFox, DECT, or other prevalent technologies.

Figure 5:
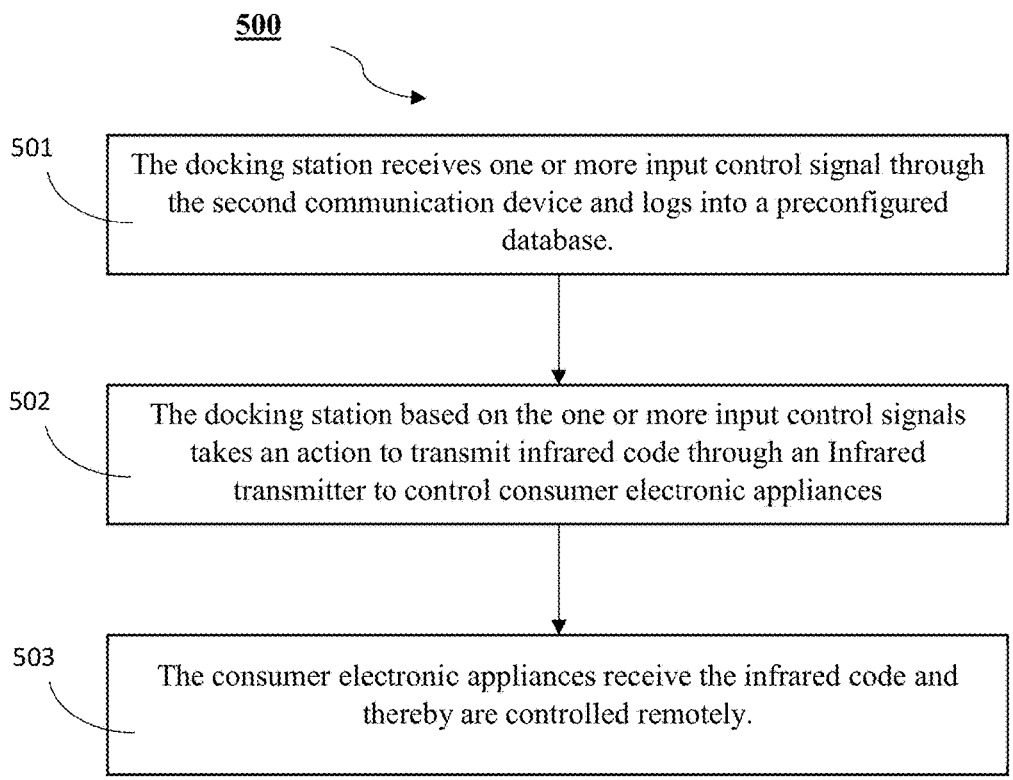
FIG. 5 illustrates a flow diagram 500 depicting communication between the first communication device and the second communication device, in accordance with an embodiment of the present application.

Now referring to FIG. 5, a flow diagram 500 depicting communication between the first communication device 101 and the second communication device is illustrated, in accordance with an embodiment of the present application. At step 501, the docking station 106 may receive one or more input control signal through the second communication device 103. In one embodiment, the docking station 106 may receive the one or more input control signal via the communication channel selected from a group comprising short-message services (SMS), GPRS/3G/4G, Wi-Fi, Z-Wave, ZigBee, DECT, Bluetooth and Bluetooth Low Energy (BLE). In one embodiment, the second communication device 103 may log into the preconfigured database.

In one embodiment, the second communication device 103, which is connected to the docking station 106, may receive the one or more control signals in form of command messages via one of the communication channels including SMS, Wi-Fi, GPRS/3G/4G, Bluetooth, Bluetooth Low Energy (BLE), LoRA, NB-IoT, SigFox, DECT, or other prevalent technologies. The second communication device 103 may be connected to the docking station 106 either via a physical connection or via a radio frequency protocol. The second communication device 103 may decode the one or more input control signals and perform the corresponding action. In one exemplary embodiment, the first communication device 101 may send a command message to the second communication device 103 to obtain temperature readings. The second communication device 103 may retrieve the temperature reading values from the docking station 106 and transmit the temperature reading values to the first communication device 101. In one embodiment, the second communication device 103 may transmit the temperature reading values to the first communication device 101 via the communication channel selected from a group comprising short-message services (SMS), GPRS/3G/4G, Wi-Fi, Z-Wave, ZigBee, Bluetooth, Bluetooth Low Energy (BLE), LoRA, NB-IoT, SigFox, DECT, or other prevalent technologies. In one embodiment, the second communication device 103 may select the same communication channel used previously by the first communication device 101 for transmitting the command message to second communication device 103. At step 502, the docking station 106 based on the one or more input control signal takes an action to transmit infrared code through Infrared transmitter to control consumer appliances. At step 503, the consumer electronic appliances may receive the Infrared code and hence controlled remotely.

Figure 6:
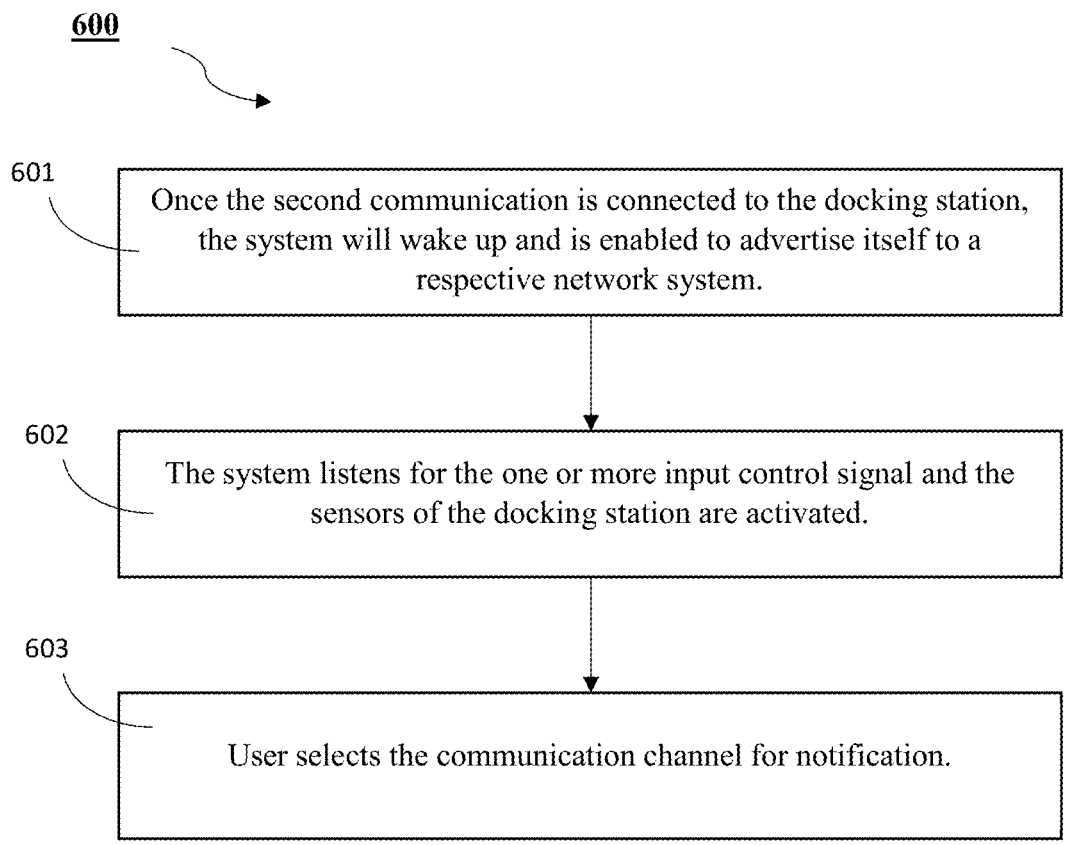
FIG. 6 illustrates a flow diagram 600 depicting connection of the second communication device with an external home automation network system, in accordance with an embodiment of the present application.

Now referring to FIG. 6, a flow diagram 600 depicting connection of the second communication device with an external home automation network system is illustrated, in accordance with an embodiment of the present application. At step 601, once the second communication device 103 is connected to the docking station 106, the system may wake up and advertise itself to the respective network system. At step 602, the system may receive the one or more input control signals and the sensors of the docking station 106 may be activated. At step 603, user may select the communication channel for notification and control, wherein the communication channel is selected from a group comprising short-message services (SMS), GPRS/3G/4G, Wi-Fi, Z-Wave, ZigBee, Bluetooth, Bluetooth Low Energy (BLE), LoRA, NB-IoT, SigFox, DECT, or other prevalent technologies.

Figure 7:
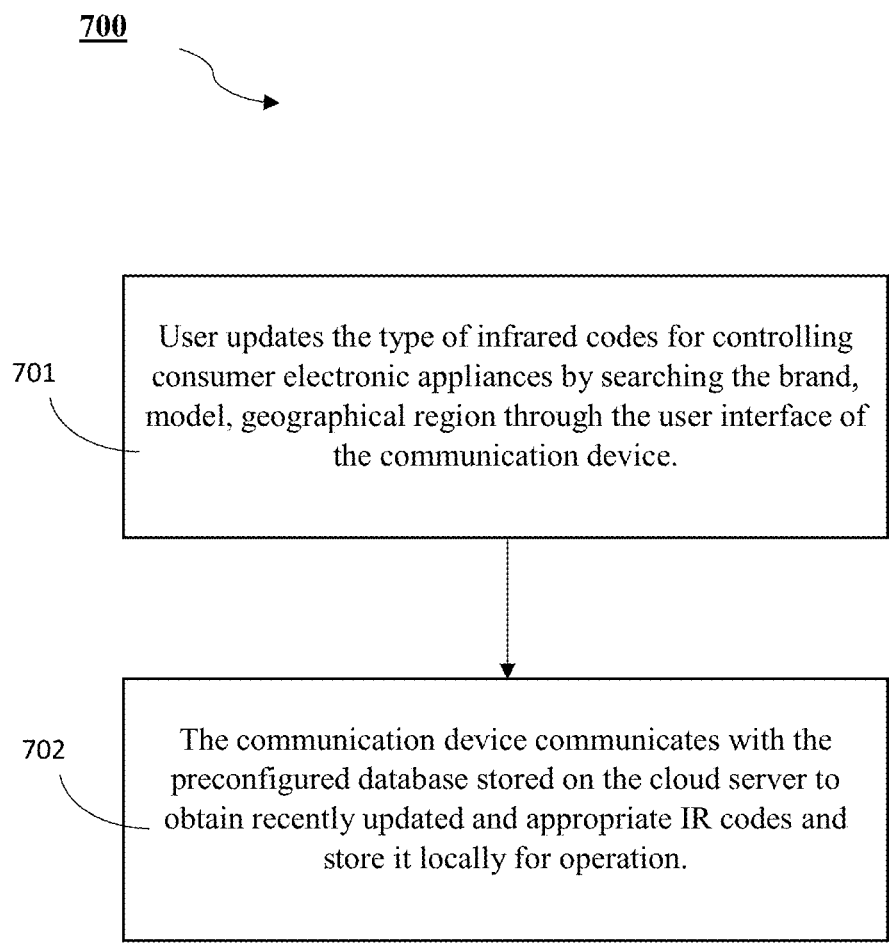
FIG. 7 illustrates a flow diagram 700 depicting steps implemented for retrieval the Infrared codes from a cloud server through the second communication device to update the docking station's processor, in accordance with an embodiment of the present application.

Now referring to FIG. 7, a flow diagram 700 depicting steps implemented for retrieval the Infrared codes from a cloud server through the second communication device to update the docking station's processor is illustrated, in accordance with an embodiment of the present application. At step 701, user may update the type of infrared codes for controlling consumer electronics appliance by searching the brand, model, geographical region through the user interface of either of the communication devices (i.e. the first communication device 101 or the second communication device 103). At step 702, the second communication device, communicates with the preconfigured database stored on the cloud server 107 to obtain recently updated and appropriate IR codes and store the IT codes locally for operation.

Figure 8:
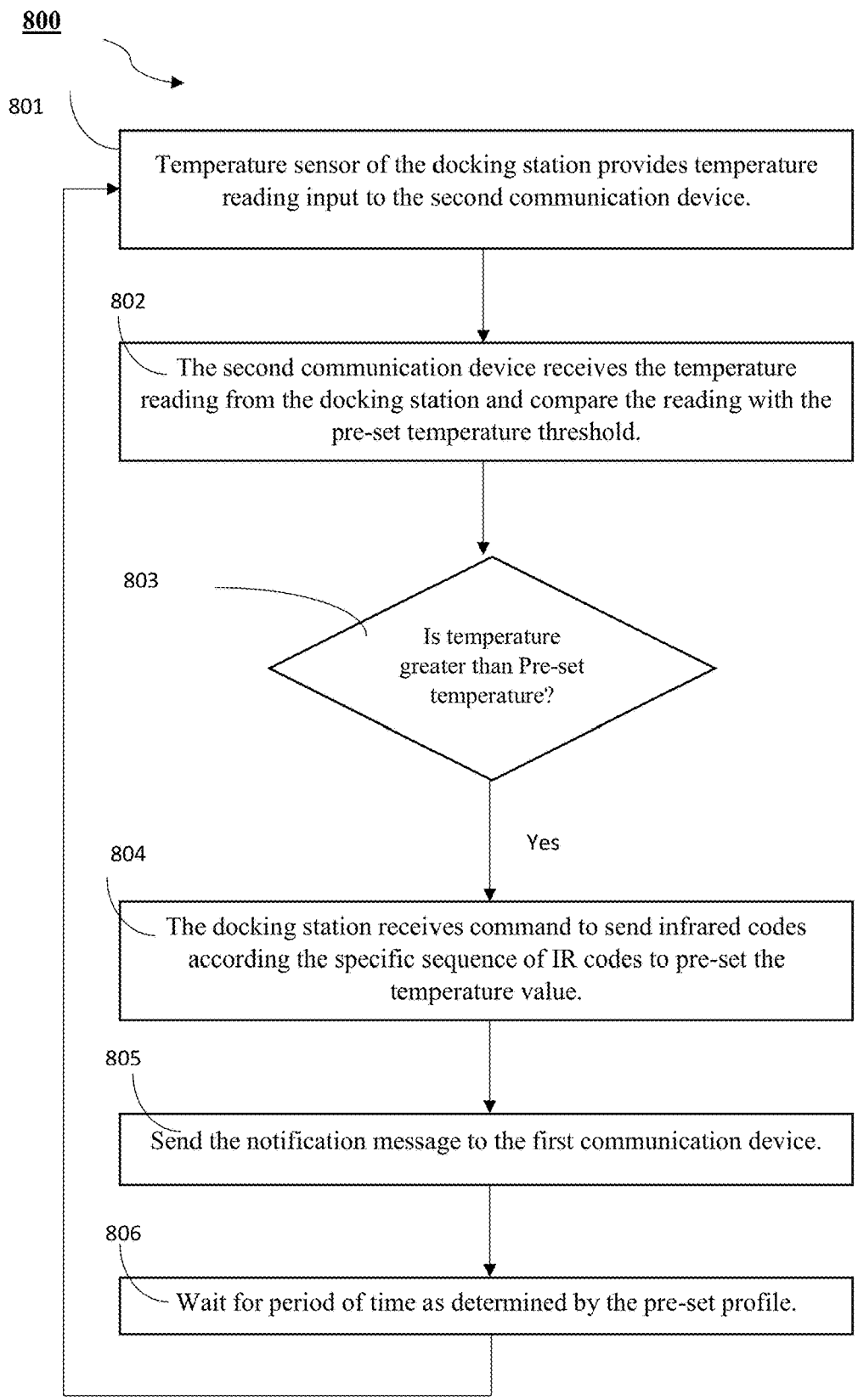
FIG. 8 illustrates a flow diagram 800 depicting steps implemented for reading temperature from the docking station, in accordance with an embodiment of the present application.

Now referring to FIG. 8, a flow diagram 800 depicting steps implemented for reading temperature from the docking station 106 is illustrated, in accordance with an embodiment of the present application. At step 801, the temperature sensor 208 of the docking station 106 may provide temperature reading input to the second communication device 103. At step 802, the second communication device 103 may receive the temperature reading from the docking station 106 and compare the temperature reading with a pre-set temperature threshold. At step 803, the second communication device 103 may check whether the temperature reading is greater than pre-set temperature. At step 804, if the temperature reading is greater than pre-set temperature, the second communication device 103 may send command to the docking station 106 to adjust temperature. In one embodiment, the docking station 106 based upon receipt of the command may further send infrared codes according a specific sequence to pre-set temperature value. In one embodiment, the docking station 106 may control the temperature of the appliance by transmitting infrared code. At step 805, the second communication device 103 may transmit the notification message to the first communication device 101 indicating the pre-setting of the temperature. At step 806, the system may wait for specific period of time as determined by the preset profile and again repeat the steps to adjust the temperature.

Figure 9:
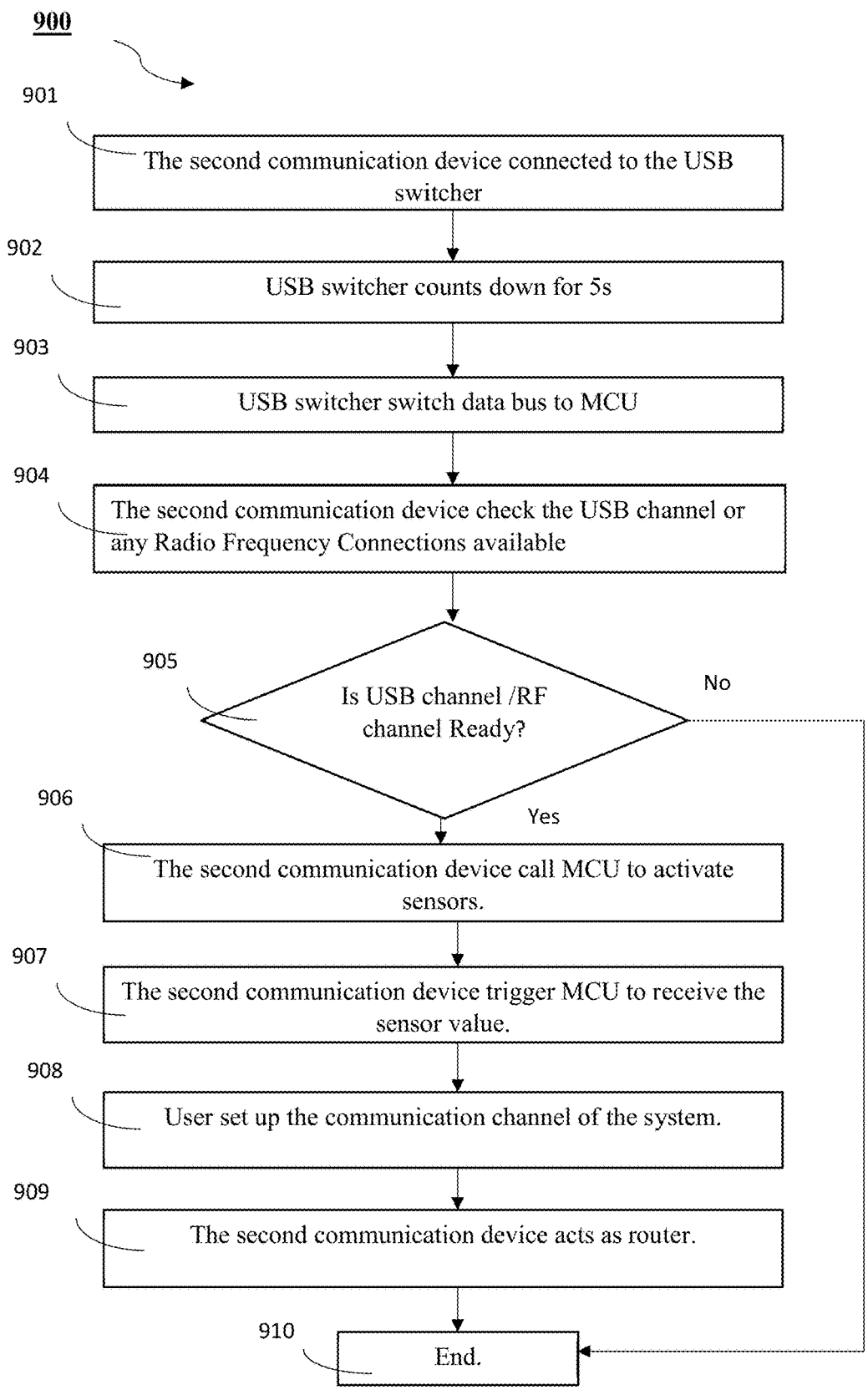
FIG. 9 illustrates a flow diagram 900 depicting connection of the second communication device and the docking station, in accordance with an embodiment of the present application.

Now referring to FIG. 9, a flow diagram 900 depicting connection of the second communication device 103 and the docking station 106 is illustrated, in accordance with an embodiment of the present application. At step 901, the second communication device 103 may be connected to the USB switcher of the docking station 106. At step 902, the USB switcher counts down for 5 s. At step 903, the USB switcher may switch the data bus between the second communication device 103 and the MCU 201 which is needed for processing input and output commands. At step 904, the second communication device 101 may check the USB channel or any radio Frequency Connections available for communication with the docking station 106. At step 905, the second communication device 103 may check the whether the USB channel or RF channel is ready for the communication. If the USB channel or RF channel is ready, then at step 906, the second communication device 103 may call MCU 201 of the docking station 106 to activate the sensors. In one embodiment, if the USB channel or RF channel is not ready then communication between the second communication device 103 and docking station 106 does not take place. At step 907, the second communication device 106 may trigger the MCU 201 to receive the sensor value. At step 908, the user may set up the mode of communication of the system. In one embodiment, the first communication device 101 and second communication device 103 may be communicatively coupled with each other using communication channel selected from group comprising short-message services (SMS), GPRS/3G/4G, Wi-Fi, Z-Wave, ZigBee, Bluetooth, Bluetooth Low Energy (BLE), LoRA, NB-IoT, SigFox, DECT, or other prevalent technologies. At step 909, the second communication device 103 may act as router. In one embodiment, the second communication device 103 may provide internet connection gateway. At step 910, the connection setup between the second communication device 103 and docking station 106 may be terminated.

Figure 10:
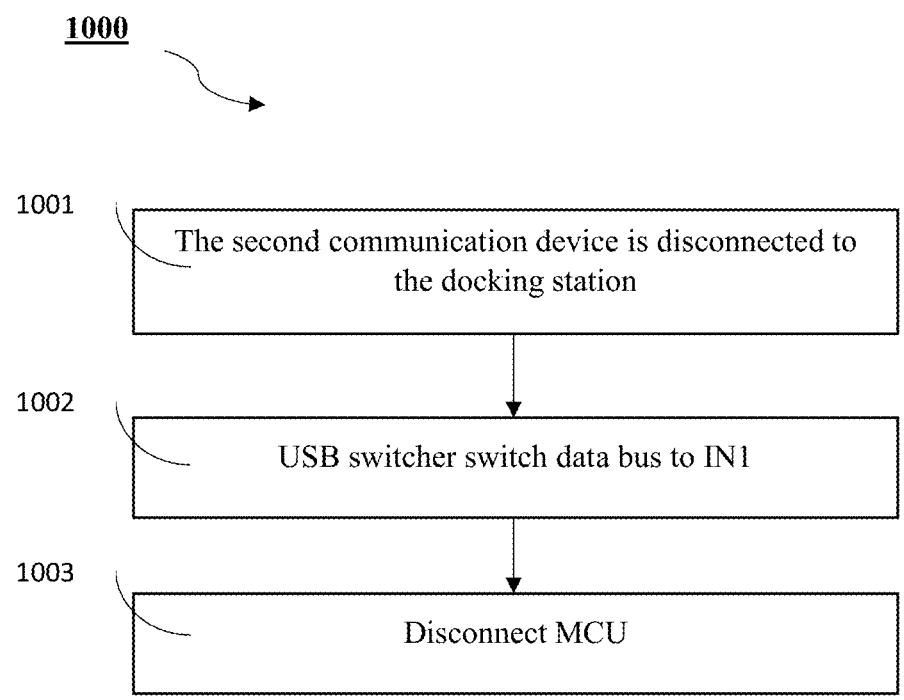
FIG. 10 illustrates a flow diagram 1000 depicting disconnection of the second communication device and the docking station, in accordance with an embodiment of the present application.

Now referring FIG. 10, a flow diagram 1000 depicting disconnection of the second communication device 103 and the docking station 106 is illustrated, in accordance with an embodiment of the present application. At step 1001, the second communication device 103 may be disconnected from the docking station 106. In one embodiment, the second communication device 103 may be physically disconnected from the docking station 106 by unplugging USB or via disabling radio frequency channel. At step 1002, the USB switcher may switch data bus to IN1 port. In one embodiment, the MCU 201 may be switched to an idle mode. At step 1003, the MCU 201 may be disconnected from the second communication device 103.

Figure 11:
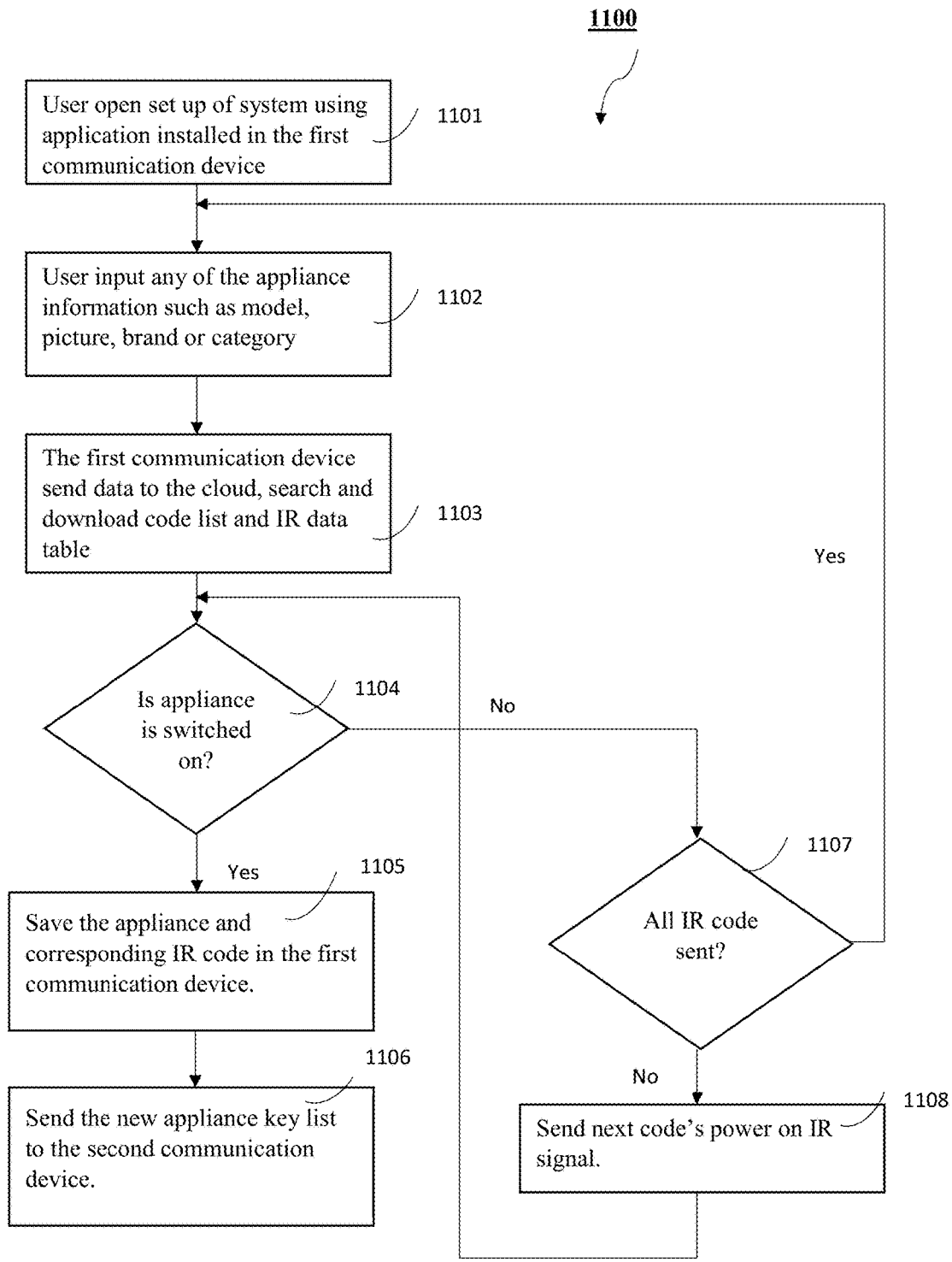
FIG. 11 illustrates a flow diagram 1100 depicting steps implemented for setup and configuration of a new consumer appliance to be controlled by the docking station, in accordance with an embodiment of the present application.

Now referring FIG. 11, a flow diagram 1100 depicting steps implemented for setup and configuration of a new consumer appliance to be controlled by the docking station 106 is illustrated, in accordance with an embodiment of the present application. At step 1101, the user opens set up of system using application installed in the first communication device 101. At step 1102, user may input any of their appliance information such as model, picture, brand or category via the first communication device 101. At step 1103, the first communication device 101 may send data to the cloud server 107, search and further download infrared code list and Infrared data table. At step 1104, the user may check, whether the appliance is switched on. If it is determined at step 1104 that the appliance is switched ON, then at step 1105, the appliance information and corresponding infrared code may be saved in the first communication device 101. At step 1106, the first communication device 101 may send the new appliance key infrared list to the second communication device 103. If it is determined at step 1104 that the appliance is not switched ON, then at step 1107, it is verified whether all infrared codes are sent to the first communication device 101. If it is determined that all infrared codes are sent, then the method is reiterated from step 1102. If it is determined that all infrared codes are not sent, then at step 1108 next code's power on infrared signal is sent and the method is reiterated from step 1104 for the next IR code.

Figure 12:
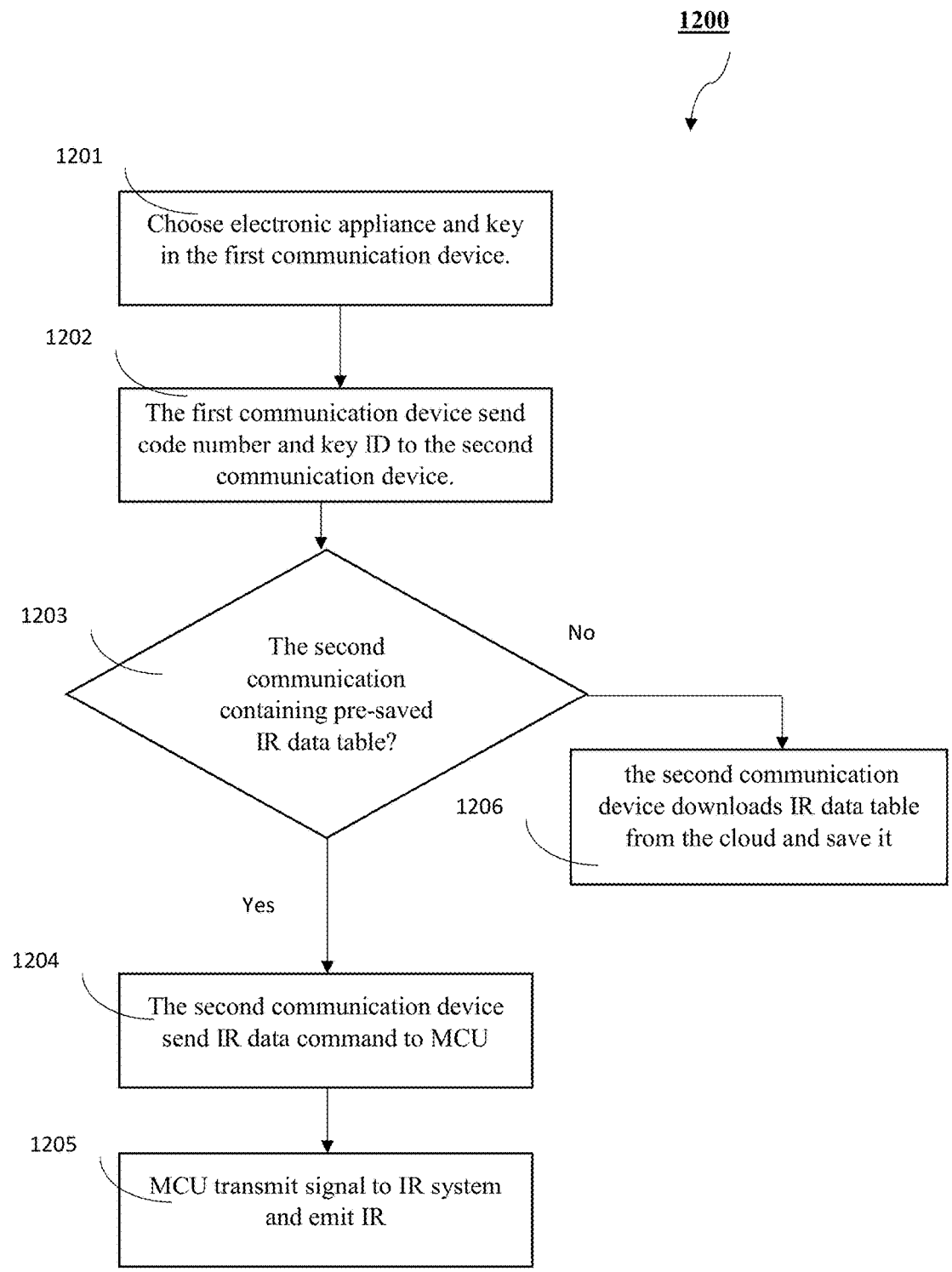
FIG. 12 illustrates a flow diagram 1200 depicting steps implemented for controlling a consumer appliance by sending an Infrared signal, in accordance with an embodiment of the present application.

Now referring FIG. 12, a flow diagram 1200 depicting steps implemented for controlling a consumer appliance by sending an Infrared signal is illustrated, in accordance with an embodiment of the present application. At step 1201, the user may select a consumer appliance and key in the first communication device 101. At step 1202, the first communication device 101 may send a code number and a key ID to the second communication device 103 via selected mode or channel of communication. At step 1203, the second communication device 103 may check whether the infrared data table is saved in the second communication device 103, If the infrared data table is saved in the second communication device, then at step 1204, the second communication device 103 may send infrared data command to the MCU. At step 1205, the MCU may call the infrared transmitter 104*a* and 104*b* in order to emit Infrared signal. If the Infrared data table is not saved in the second communication device 103, then at step 1206, the second communication device 103 may download the Infrared data table from the cloud server 107 and save the Infrared data table in the second communication device 103.

Figure 13:
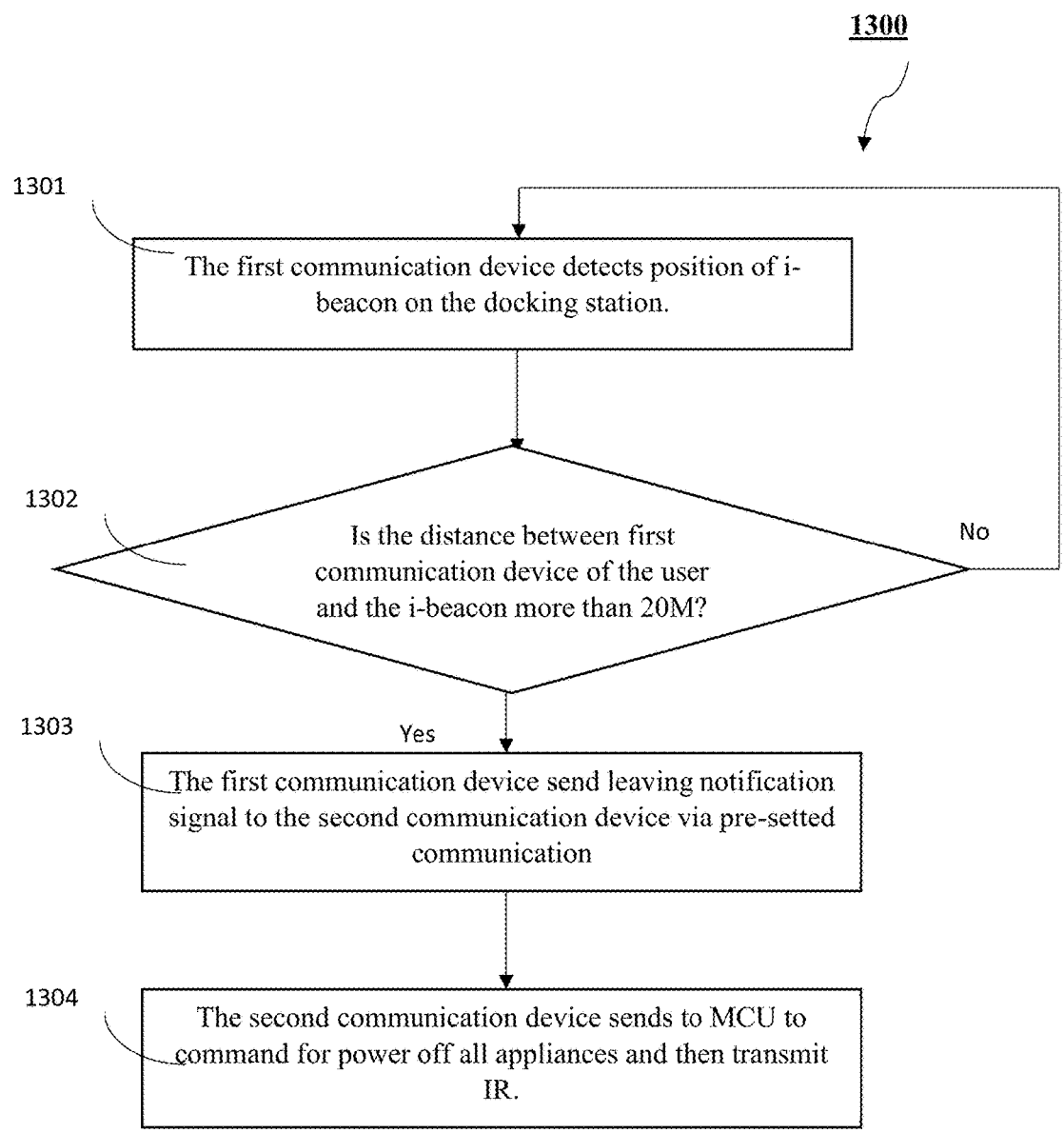
FIG. 13 illustrates a flow diagram 1300 depicting working of an i-beacon transceiver in the docking station, in accordance with an embodiment of the present application.

Now referring FIG. 13, a flow diagram 1300 depicting working of an i-beacon transceiver 202 in the docking station 106 is illustrated, in accordance with an embodiment of the present application. At step 1301, the first communication device 101 may detect a position of the i-beacon transceiver 202 on the docking station 106. At step 1302, the first communication device 101 may check whether the distance between first communication device 101 of the user and the i-beacon transceiver is greater than 20 m. If the distance between the first communication device 101 and i-beacon is more than 20M, then at step 1303, the first communication device 101 may transmit leaving notification signal to the second communication device 103 via pre-set communication. At step 1304, the second communication device 103 may call the MCU of the docking station 106 to power off all appliances. In one embodiment, the MCU may transmit infrared code to the appliances to switch off all the appliances.

Figure 14:
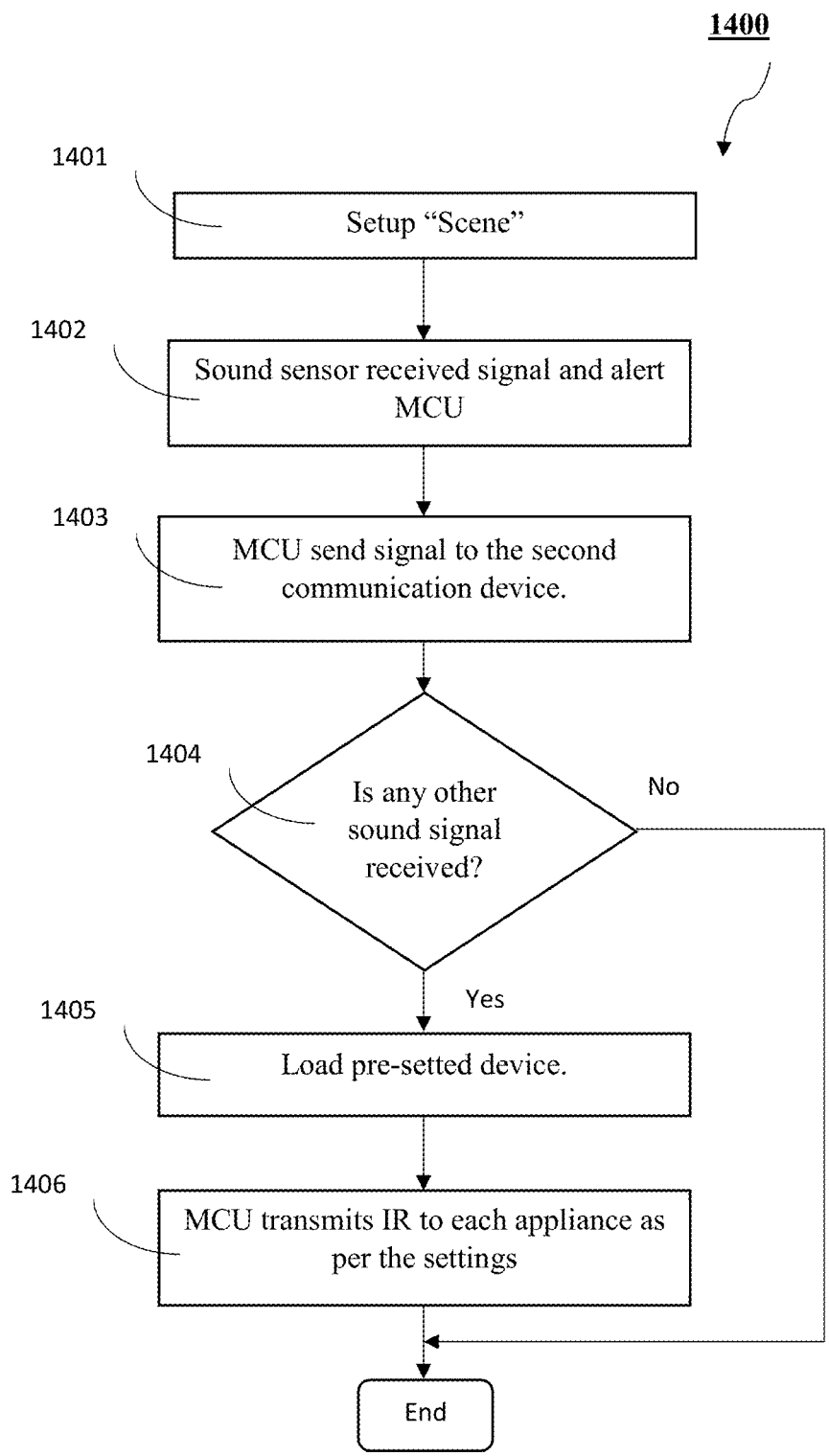
FIG. 14 illustrates a flow diagram 1400 to use of sound sensor to activate scene, in accordance with an embodiment of the present application.

Now referring FIG. 14, a flow diagram 1400 illustrates the steps involved for sound sensor to activate scene, in accordance with the present application. At step 1401, the user first setups the scene in the second communication device 103 which is connected to the docking station 103. In one exemplary embodiment, user may clap his hands twice or more as setup scene. At step 1402, the sound sensor 214 receives sound signal and alerts MCU. At step 1403, MCU may send signal to the second communication device 103. At step 1404, the second communication device 103 may check whether any other sound signal received. If yes, then at step 1405, the second communication device 103 may load preset device. At step 1406, the second communication device 103 may call the MCU to transmit infrared code to each appliance as per the settings. In one exemplary embodiment, the user may store the infrared code of TV and sound bar in the communication device. The second communication device 103 may send infrared code of TV and sound bar. In one embodiment, the user may select number of devices with the settings, levels, modes or operating conditions according to preference. In one exemplary embodiment, If the user claps twice, the second communication device 103 may load the infrared data from the setting and then pack and send the data to MCU for emitting infrared one by one.

Figure 15:
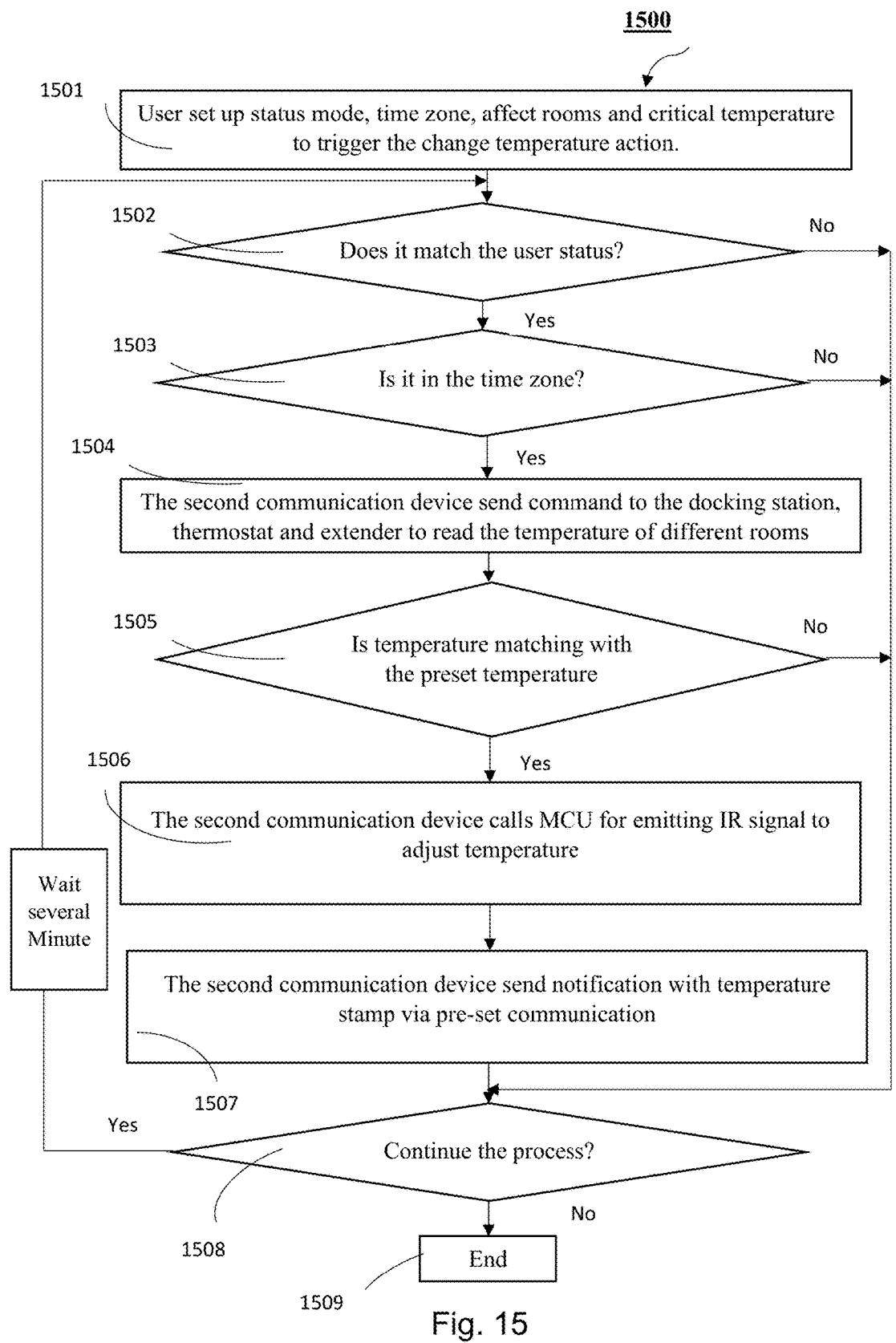
FIG. 15 illustrates a flow diagram 1500 to auto adjust the temperature, in accordance with the present application.

Now referring FIG. 15, a flow diagram 1500 illustrates the steps involved for auto adjust the temperature, in accordance with the present application. At step 1501, the user may set up status mode, time zone, affect rooms and critical temperature to trigger the change temperature action. At step 1502 and step 1503, the second communication device 103 may check whether status mode or time zone is matched with previously set status mode or time zone. If status matched then at step 1504, the second communication device 103 may send control signal to thermostat or temperature sensor 208 and extender to read the temperature of different rooms through the docking station 106. At step 1505, the MCU may check whether temperature match the preset temperature in preserve room, if the temperature match with the preset temperature, then at step 1506, the second communication device 103 may call the MCU and enable the infrared transmitter for emitting Infrared signal to adjust temperature. At step 1507, the second communication device further sends notification with temperature stamp via preset communication to the first communication device 101. At step 1508, the MCU may check whether process is continuous if yes then complete the process. If not, then repeat the process after waiting for 1 minute. In one exemplary embodiment, the user may setup effective time from 9:00 to 18:00 in away mode. When home temperature is higher than 26° C. then may enable to set temperature at 23° C. In one exemplary embodiment, when the temperature is lower than 23° C. then may enable system to set temperature at 25° C.

Figure 16:
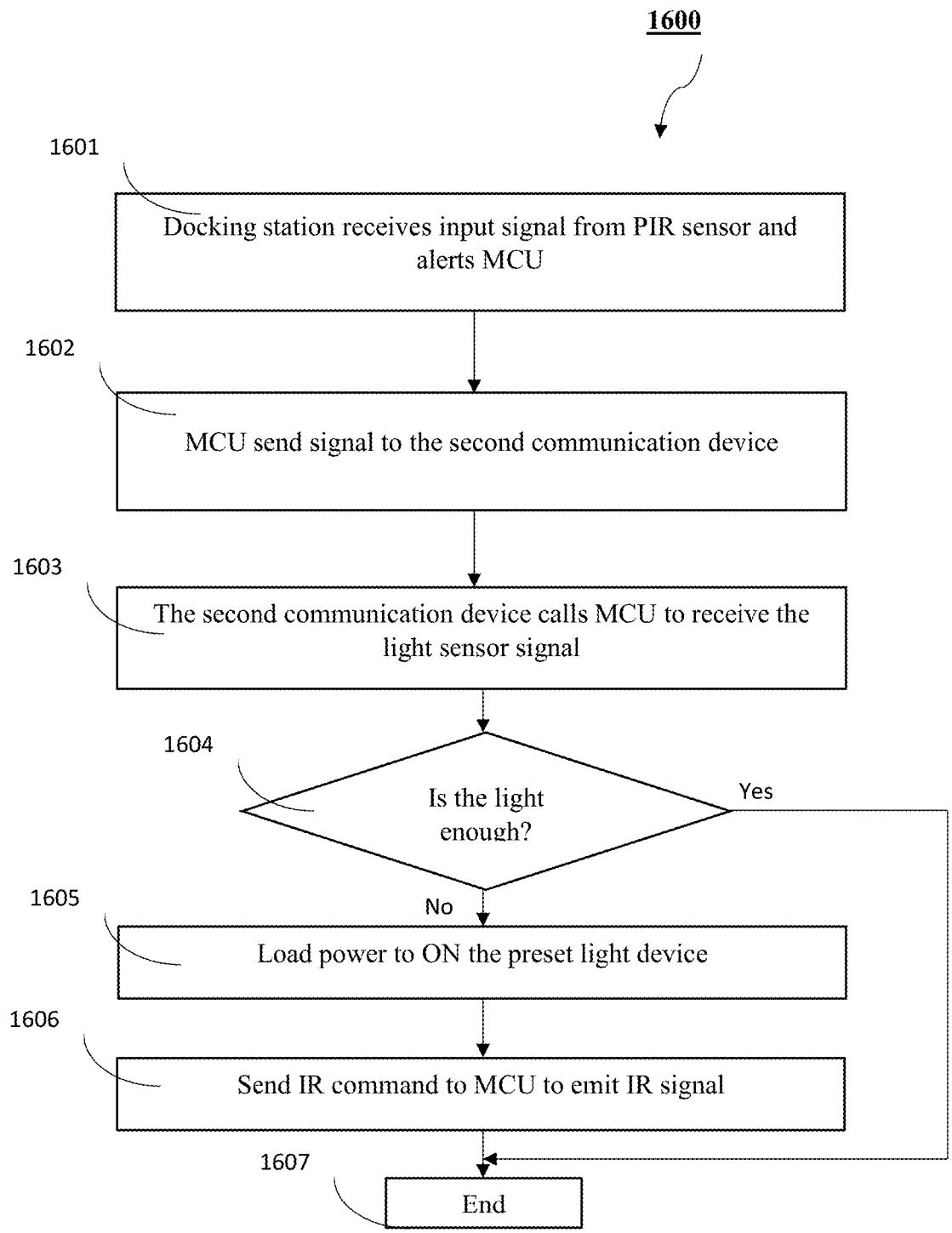
FIG. 16 illustrates a flow diagram 1600 to explain working of PIR sensor and light sensor to control lighting, in accordance with an embodiment of the present application.

Now referring FIG. 16, a flow diagram 1600 illustrates the steps involved for working of PIR sensor 213 and light sensor 211 to control lighting, in accordance with the present application. At step 1601, the docking station 106 may receive input signal from PIR sensor 213 and alerts MCU. At step 1602, MCU may send signal to the second communication device 103. At step 1603, the second communication device 103 may call the MCU to receive the light sensor 211 signal. At step 1604, the MCU may check whether it is the light is enough or not. If yes, at step 1605, the MCU may load power to the preset light device. At step 1606, the second communication device 103 may call MCU to enable infrared transmitter for emitting infrared signal to switch on the lights. In one exemplary embodiment, if the user wants to go to toilet while sleeping. At that time, the lighting is off and PIR sensor 213 may notice the movement of user. The MCU then sends the signal to second communication device 103. The second communication device 103 may ask MCU to get the light sensor 211 signal to check whether it is dark. If it is dark, the second communication device 103 will send the power on signal of lighting.

Although embodiments of the present application have been described in relation to a docking station, any embodiments or enclosure that connects the phones via the communication interface such as USB-C, Lightning, or via other radio frequency protocols such as Bluetooth, Wi-Fi, ZigBee, DECT, or Z-wave etc. are also intended to be encompassed within the scope of the present application. For example, beside a docking station, other embodiments of the present application can be represented by other connected devices, such as one that looks like a speaker or a clock or any electrical or consumer electronic appliance like oven, fans, etc.

Figure 17:
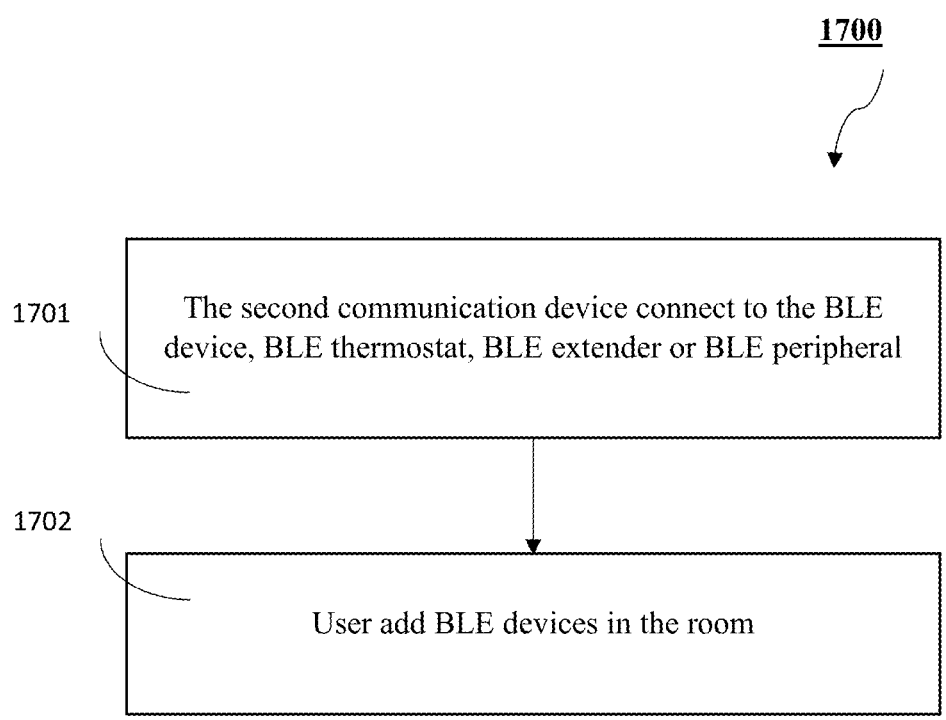
FIG. 17 illustrates a flow diagram 1700 for connection setup of the BLE device to the second communication device, in accordance with an embodiment of the present application.

Now referring FIG. 17, a flow diagram 1700 illustrates the steps involved for connection setup of the BLE device to the second communication device, in accordance with the present application. At step 1701, the second communication device 103 may connect to the BLE device, BLE thermostat, BLE extender or BLE peripheral using BLE communication protocol. At step 1702, the user may add BLE devices in the room. In one exemplary embodiment, the second communication device may use the mobile application installed in the device to connect the BLE devices, then second communication device may store the Rooms profile (e.g. Bedroom 1, Living Room) of where the BLE devices is located.

Figure 18:
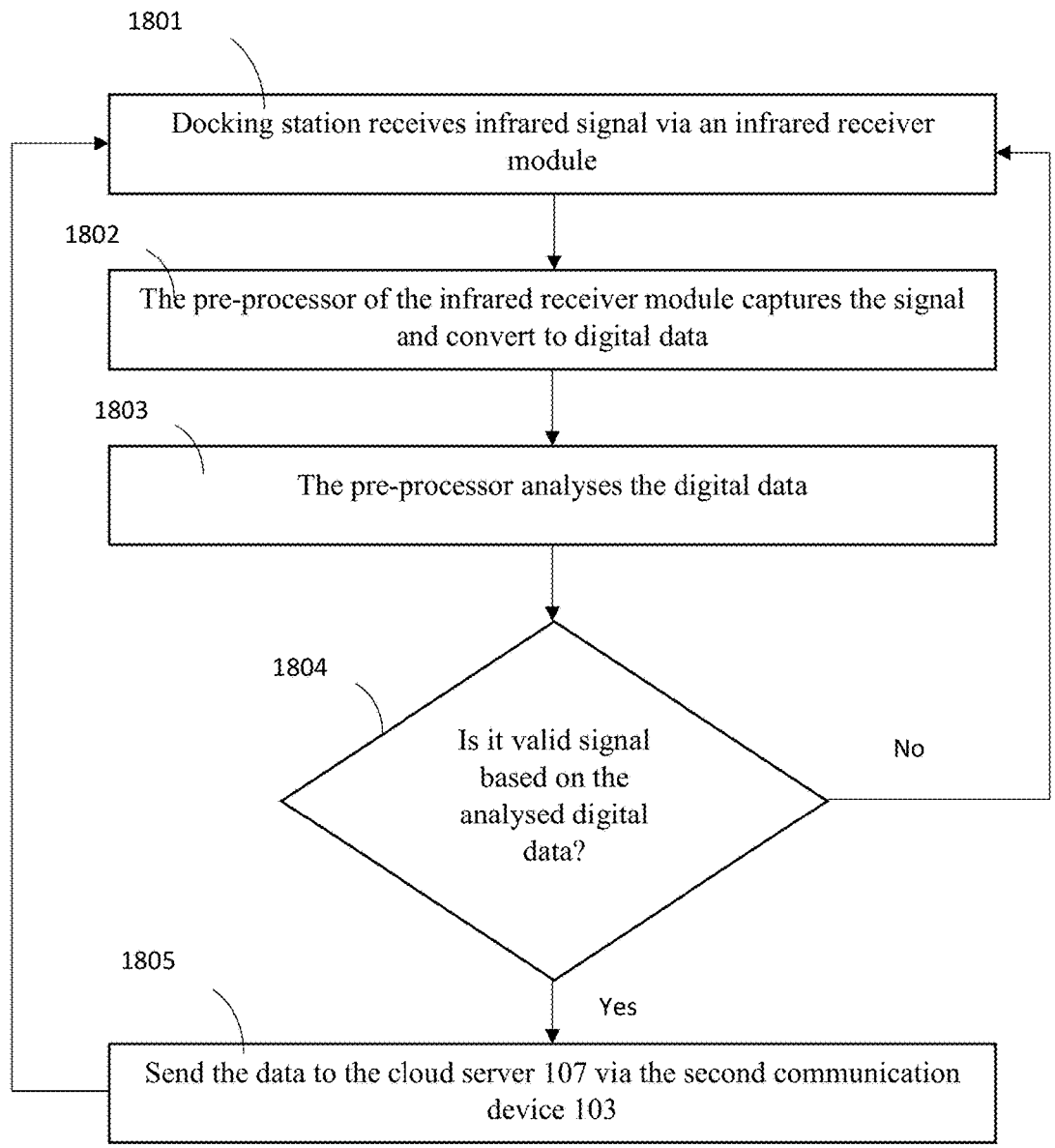
FIG. 18 illustrates a flow diagram 1800 depicting steps involved for working of an Infrared Receiver Module 215 within the docking station to capture and process the Infrared Signal received from an input control device 108, in accordance with an embodiment of the present application.

Now referring FIG. 18, a flow diagram illustrates the steps depicting the working of an infrared receiver module 215 to capture the infrared signal from the input control device 108, in accordance with an embodiment of the present application. In this embodiment, the user may use a remote control or the universal remote control (i.e. the input control device 108) to control the home appliances. Therefore, the docking station 106 may directly capture the infrared signal from the input control device 108 (i.e. the remote control or the universal remote control). At step 1801, the infrared receiver module 215 within the docking station 106 may receive the infrared signals from the input control device 108. In one embodiment, the infrared receiver module 215 may include a pre-processor 216 and a memory unit 217. At step 1802, the infrared receiver module 215 may receive the infrared signal via the pre-processor 216. Further, the pre-processor 216 may convert the infrared signal into a digital data. At step 1803, the pre-processor 216 may analyze the digital data. At step 1804, the pre-processor 216 may check whether received infrared signal is valid or not based upon analyzed digital data. If the received infrared signal is detected as a valid signal, at step 1805, the pre-processor 216 may trigger the MCU to send the digital data to the cloud server. The MCU may request the second communication device 103 to send the valid data to the cloud server 107. In one embodiment, the second communication device 103 may send the digital data to the cloud server 107 via the Network 102. In one embodiment, the first communication device 101 may receive the updated status from the cloud server 107.

What is claimed is:

1. A remote-control system, comprising:
a docking station comprising an infrared receiving module and a Micro-controller unit (MCU), wherein the infrared receiving module is communicatively coupled with an input control device, and wherein the infrared receiving module further comprises a pre-processor and a memory unit storing programmed instructions capable of being executed by the pre-processor, and wherein the MCU further comprises a processor and a memory storing programmed instructions capable of being executed by the processor;
wherein the pre-processor or the processor, based upon receipt of one or more input control signals from the input control device and one or more input control signals from a first communication device, is configured to execute one or more programmed instructions to
demodulate the one or more input control signals, and
modulate the one or more input control signals demodulated to obtain one or more modulated control signals; and
wherein the processor is further configured to execute one or more programmed instructions to
retrieve one or more infrared codes from a preconfigured database based upon the one or more modulated control signals, and
transmit the one or more infrared codes to one or more consumer electronic devices in order to remotely control the one or more consumer electronic devices.

2. The remote-control system of claim 1, wherein the docking station is electronically coupled with a second communication device, wherein the second communication device is communicatively coupled with the first communication device, wherein the second communication device is capable of receiving one or more input control signals from the first communication device via a communication channel selected from a group consisting of short-message services (SMS), GPRS/3G/4G, Wi-Fi, Z-Wave, ZigBee, Bluetooth, Bluetooth Low Energy (BLE), LoRA, NB-IoT, SigFox, and DECT.

3. The remote-control system of claim 2, wherein the docking station is electronically coupled with the second communication device via an USB interface or a radio frequency protocol selected from a group consisting of Bluetooth, Wi-Fi, ZigBee, Z-Wave, LoRA, NB-IoT, SigFox, and DECT.

4. The remote-control system of claim 3, wherein the docking station is communicatively coupled with the preconfigured database, wherein the preconfigured database is either embedded within memory or within a cloud server coupled with the remote-control system.

5. The remote-control system of claim 4, wherein the docking station is adapted to obtain updated infrared codes from the cloud server through the second communication device.

6. The remote-control system of claim 5, wherein the docking station is capable of communicating with the second communication device or an external system via a communication module selected from a group consisting of i-beacon transceiver, Wi-Fi, Bluetooth, ZigBee, DECT, and Z-Wave radio frequency module.

7. The remote-control system of claim 6, wherein the docking station further comprises one or more sensors for measuring temperature, humidity, vibration, light, motion, passive infrared (PIR), sound, air quality, and infrared signals.

8. The remote-control system of claim 7, wherein the docking station is adapted to receive input temperature sensor reading in order to auto adjust temperature of a consumer electronic appliance.

9. The remote-control system of claim 8, wherein the docking station further comprises a motorized gearbox in order to provide a tilt and pan functions.

10. The remote-control system of claim 1, wherein the docking station is adapted to accept external DC power supply, and wherein the docking station further provides constant power supply to a second communication device.

11. The remote-control system of claim 1, wherein the docking station further comprises an infrared transmitter and an infrared firmware, wherein the infrared transmitter is adapted to transmit one or more infrared codes using the infrared firmware.

12. A method for enabling remote control docking station and system, the method comprising;
receiving, via an infrared receiving module or a second communication device, one or more input control signals transmitted by an input control device and one or more input control signals transmitted by a first communication device;
performing by a pre-processor within the infrared receiving module or a processor within the docking station, based upon receipt of the one or more input control signals from the input control device and the one or more input control signals from the first communication device, the steps of
demodulating the one or more input control signals, and
modulating the one or more input control signals demodulated to obtain one or more modulated control signals;
retrieving, via the processor, one or more infrared codes from a preconfigured database based upon the one or more modulated control signals; and
transmitting, via the processor, the one or more infrared codes to one or more consumer electronic devices in order to remotely control the one or more consumer electronic devices.

13. The method of claim 12 further comprising updating the preconfigured database with updated infrared codes obtained from the cloud server, wherein the cloud server is communicatively coupled with the remote-control docking station and system.

14. The method of claim 12 further comprising enabling auto adjustment of temperature by comparing input temperature sensor reading with pre-set temperature.

15. A docking station, comprising:
an infrared receiving module and a Micro-controller unit (MCU), wherein the infrared receiving module is communicatively coupled with an input control device, and wherein the infrared receiving module further comprises a pre-processor and a memory unit storing programmed instructions capable of being executed by the pre-processor, and wherein the MCU further comprises a processor and a memory storing programmed instructions capable of being executed by the processor;
wherein the pre-processor or the processor, based upon receipt of one or more input control signals from the input control device and one or more input control signals from a first communication device, is configured to execute one or more programmed instructions to
- demodulate the one or more input control signals, and
- modulate the one or more input control signals demodulated to obtain one or more modulated control signals; and wherein the processor is further configured to execute one or more programmed instructions to
- retrieve one or more infrared codes from a preconfigured database based upon the one or more modulated control signals, and
- transmit the one or more infrared codes to one or more consumer electronic devices in order to remotely control the one or more consumer electronic devices.

16. The docking station of claim 15, configured to receive inputs from one or more sensors such as temperature, humidity, vibration, light, motion, passive infrared (PIR), sound, air quality, and infrared signals.

17. The docking station of claim 16, is communicatively coupled with the preconfigured database in order to retrieve infrared codes, wherein the preconfigured database is either embedded within memory or within a cloud server coupled with remote control system.

18. The docking station of claim 15, capable of communicating with a second communication device or an external system via a communication module selected from a group consisting of i-beacon transceiver, Wi-Fi, Bluetooth, ZigBee, DECT, and Z-Wave radio frequency module.

19. The docking station of claim 18, adapted to obtain updated infrared codes from a cloud server through the second communication device, wherein the second communication device is communicatively coupled with the cloud server via a network.

20. The docking station of claim 15, comprises an infrared transmitter and an infrared firmware, wherein the infrared transmitter is adapted to transmit the one or more infrared codes using the infrared firmware.

* * * * *